US008052849B2

(12) United States Patent
Lahann et al.

(10) Patent No.: US 8,052,849 B2
(45) Date of Patent: *Nov. 8, 2011

(54) MULTI-PHASIC NANOPARTICLES

(75) Inventors: Joerg Lahann, Ann Arbor, MI (US); David C. Martin, Lincoln University, PA (US); Kyung-Ho Roh, Mountain View, CA (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/821,688

(22) Filed: Jun. 23, 2010

(65) Prior Publication Data

US 2011/0062608 A1    Mar. 17, 2011

Related U.S. Application Data

(62) Division of application No. 11/272,194, filed on Nov. 10, 2005, now Pat. No. 7,767,017.

(60) Provisional application No. 60/626,792, filed on Nov. 10, 2004, provisional application No. 60/651,288, filed on Feb. 9, 2005.

(51) Int. Cl.
*H05F 3/00* (2006.01)
*B05D 1/04* (2006.01)
*B29C 67/00* (2006.01)

(52) U.S. Cl. ............ 204/164; 106/401; 264/9; 264/484; 424/489; 977/906

(58) Field of Classification Search .................. None
See application file for complete search history.

(56) References Cited

U.S. PATENT DOCUMENTS

| 3,060,429 | A | | 10/1962 | Winston |
| 4,621,268 | A | | 11/1986 | Keeling et al. |
| 5,560,543 | A | | 10/1996 | Smith et al. |
| 5,741,138 | A | | 4/1998 | Rice et al. |
| 5,813,614 | A | | 9/1998 | Coffee |
| 6,007,845 | A | * | 12/1999 | Domb et al. ............ 424/501 |
| 6,063,365 | A | | 5/2000 | Shefer et al. |
| 6,107,102 | A | | 8/2000 | Ferrari |
| 6,132,702 | A | | 10/2000 | Witt et al. |
| 6,252,129 | B1 | | 6/2001 | Coffee |

(Continued)

FOREIGN PATENT DOCUMENTS

EP    1809719    7/2007

(Continued)

OTHER PUBLICATIONS

Gupta et al. Polymer, 44(2003), 6353-6359.*

(Continued)

*Primary Examiner* — Melvin Curtis Mayes
*Assistant Examiner* — Yun Qian
(74) *Attorney, Agent, or Firm* — Harness, Dickey & Pierce, P.L.C.

(57) ABSTRACT

A method of forming mufti-phasic nano-objects involves the jetting of two or more different liquids in side-by-side capillaries thereby generating a composite liquid stream. The composite then exposed to a force field which causes the composite liquid stream to at least partially solidify into a nano-object. The method forms a nano-object having a number of morphologies such as rods, spheres, and fibers.

18 Claims, 7 Drawing Sheets

U.S. PATENT DOCUMENTS

| | | | |
|---|---|---|---|
| 6,267,724 | B1 | 7/2001 | Taylor |
| 6,306,993 | B1 | 10/2001 | Rothbard et al. |
| 6,391,471 | B1 | 5/2002 | Hiraoka et al. |
| 6,491,902 | B2 | 12/2002 | Shefer et al. |
| 6,548,264 | B1 | 4/2003 | Tan et al. |
| 6,589,562 | B1 | 7/2003 | Shefer et al. |
| 6,669,961 | B2 | 12/2003 | Kim et al. |
| 6,685,921 | B2 | 2/2004 | Lawlor |
| 6,703,235 | B2 | 3/2004 | Luebke et al. |
| 6,766,817 | B2 | 7/2004 | da Silva et al. |
| 6,811,090 | B2 | 11/2004 | Yogi et al. |
| 6,825,161 | B2 | 11/2004 | Shefer et al. |
| 6,918,404 | B2 | 7/2005 | Dias da Silva et al. |
| 7,066,586 | B2 | 6/2006 | da Silva et al. |
| 7,413,868 | B2 | 8/2008 | Kauvar et al. |
| 7,446,084 | B2 | 11/2008 | Barthel et al. |
| 7,767,017 | B2 | 8/2010 | Lahann et al. |
| 7,947,772 | B2 | 5/2011 | Lahann et al. |
| 2007/0054119 | A1 | 3/2007 | Garstecki et al. |
| 2007/0112180 | A1 | 5/2007 | Gray et al. |
| 2007/0231355 | A1 | 10/2007 | Quadir et al. |
| 2007/0237800 | A1 | 10/2007 | Lahann |
| 2010/0015447 | A1 | 1/2010 | Lahann et al. |
| 2010/0038830 | A1* | 2/2010 | Lahann et al. ............ 264/484 |

FOREIGN PATENT DOCUMENTS

| | | |
|---|---|---|
| JP | 2004-505761 | 2/2004 |
| JP | 2005504090 | 2/2005 |
| JP | 4690418 | 2/2011 |
| WO | WO 02/13786 | 2/2002 |
| WO | WO 03/026611 | 4/2003 |
| WO | WO 2006/003403 | 1/2006 |
| WO | WO 2006/137936 | 12/2006 |
| WO | WO 2007/149310 | 12/2007 |
| WO | WO 2009/055693 | 4/2009 |
| WO | WO 2009/151421 | 12/2009 |
| WO | WO 2010/011641 | 1/2010 |
| WO | WO 2010/032971 | 3/2010 |
| WO | WO 2010/127119 | 11/2010 |

OTHER PUBLICATIONS

Huang et al. Composites Science and Technology, 63 (2003), 2223-2253.*

Bhaskar, Srijanani, et al., "Towards Designer Microparticles: Simultaneous Control of Anisotropy, Shape, and Size," Small, vol. 6, No. 3, pp. 404-411 (2010) (first published online Nov. 20, 2009).

Roh, Kyung-Ho, et al., "Water-Stable Biphasic Nanocolloids with Potential Use as Anisotropic Imaging Probes," Langmuir, vol. 23, No. 10, pp. 5683-5688 (2007) (first published online Jan. 10, 2007).

Yoshida, Mutsumi, et al., "Short-term biocompatibility of biphasic nanocolloids with potential use as anisotropic imaging probes," Biomaterials, vol. 28, pp. 2446-2456 (2007) (first published online Feb. 20, 2007).

Bhaskar, Srijanani, et al., "Multicompartmental Microcylinders," Angewandte Chemie Int. Ed., vol. 48, No. 25, pp. 4589-4593 (Jun. 8, 2009) (first published online May 15, 2009).

Bhaskar, Srijanani, et al., "Microstructured Materials Based on Multicompartmental Fibers," J. Am. Chem. Soc., vol. 131, pp. 6650-6651 (2009) (first published online Apr. 29, 2009).

Mandal, Suparna, et al., "Micropatterned Fiber Scaffolds for Spatially Controlled Cell Adhesion," Macromolecular Rapid Communications, vol. 30, pp. 1638-1644 (2009) (first published online Jul. 29, 2009).

Doshi, Nishit, et al., "Red blood cell-mimicking synthetic biomaterial particles," PNAS, vol. 106, No. 51, pp. 21495-21499 (Dec. 22, 2009).

Hwang, Sangyeul, et al., "Anisotropic hybrid particles based on electrohydrodynamic co-jetting of nanoparticle suspensions," Physical Chemistry Chemical Physics, vol. 12, pp. 11894-11899 (2010) (first published online Sep. 15, 2010).

Lee, Kyung Jin, et al., "Compartmentalized Photoreactions within Compositionally Anisotropic Janus Microstructures," Macromolecular Rapid Communications, vol. 32, pp. 431-437 (2011) (first published online Dec. 10, 2010).

Lahann, Joerg, "Recent Progress in Nano-biotechnology: Compartmentalized Micro- and Nanoparticles via Electrohydrodynamic Co-jetting," Small, vol. 7, No. 9, pp. 1149-1156 (May 9, 2011) (first published online Apr. 8, 2011).

Bhaskar, Srijanani, et al., "Engineering, Characterization and Directional Self-Assembly of Anisotropically Modified Nanocolloids," Small, vol. 7, No. 6, pp. 812-819 (2011) (first published online Feb. 8, 2011).

Bhaskar, Srijanani, et al., "Spatioselective Modification of Bicompartmental Polymer Particles and Fibers via Huisgen 1,3-Dipolar Cycloaddition," Macromolecular Rapid Communications, vol. 29, No. 20, pp. 1655-1660 (Oct. 22, 2008) (first published online Sep. 12, 2008).

Gunatillake, Pathiraja A., et al., "Biodegradable Synthetic Polymers for Tissue Engineering," European Cells and Materials, vol. 5, pp. 1-16 (2003).

Cayre, Olivier, et al., "Fabrication of asymmetrically coated colloid particles by microcontact printing techniques," Journal of Material Chemistry, vol. 13, pp. 2445-2450 (2003) (first published online Sep. 2, 2003).

Cayre, Olivier, et al., "Fabrication of dipolar colloid particles by microcontact printing," Chem. Commun., pp. 2296-2297 (2003) (first published online Aug. 5, 2003).

Palm, Lars, et al., "An Optical Method for Measuring Drop Flight Stability in a Continuous Ink Jet," Journal of Imaging Science and Technology, vol. 41, No. 1 (Jan./Feb. 1997).

Erhardt, Rainer, et al., "Janus Micelles," Macromolecules, vol. 34, No. 4, pp. 1069-1075 (2001) (first published online Jan. 14, 2001).

Rodenberg, Eric J., et al., "Peptides Derived from Fibronectin Type III Connecting Segments Promote Endothelial Cell Adhesion but Not Platelet Adhesion: Implications in Tissue-Engineered Vascular Grafts," Tissue Engineering, vol. 13, No. 11, pp. 2653-2666 (2007).

Sun, Qiang, et al., "Design of Janus Nanoparticles with Atomic Precision," Mar. 2008 Meeting of the American Physical Society (Mar. 13, 2008). Abstract only.

Wako Pure Chemical Industries, Ltd., Biodegradable Polymers (PLA-PLGA), http://www.wako-chem.co.jp/specialty/plga/index.htm.

Kazemi, Abbass, et al., "Environmentally Responsive Core/Shell Particles via Electrohydrodynamic Co-jetting of Fully Miscible Polymer Solutions," Small, vol. 4, No. 10, pp. 1756-1762 (2008).

Lahann, Joerg, et al., "Biphasic nanoparticles made by electrified jetting," Mar. 2005 Meeting of the American Physical Society (Mar. 22, 2005). Abstract only.

Moffat, Kristen L., et al., "Novel Nanofiber-Based Scaffold for Rotator Cuff Repair and Augmentation," Tissue Engineering: Part A, vol. 15, No. 1, pp. 115-126 (Jan. 2009) (first published online Sep. 13, 2008).

Moffat, Kristen L., et al., "Orthopedic Interface Tissue Engineering for the Biological Fixation of Soft Tissue Grafts," Clinics in Sports Medicine, vol. 28, No. 1, pp. 157-176 (Jan. 2009).

Mo, X. et al., "PCL-PGLA composite tubular scaffold preparation and biocompatibility investigation," Int. J. Artif. Organs, vol. 29, No. 8, pp. 790-799 (Aug. 2006). Abstract only.

The PCT Written Opinion of the International Searching Authority and the International Search Report issued Apr. 3, 2007 in related International Application No. PCT/US2005/040560 (Publication No. WO 2006/137936).

The PCT Written Opinion of the International Searching Authority and the International Search Report issued Mar. 8, 2010 in related International Application No. PCT/US2009/051238 (Publication No. WO 2010/011641).

The PCT Written Opinion of the International Searching Authority and the International Search Report issued Jan. 13, 2011 in related cross-referenced International Application No. PCT/US2010/032971 (Publication No. WO 2010/127119).

Notice of Rejection issued on Jul. 27, 2010 in related matter Japanese Patent Application JP 2007-540191 (now issued as Japanese Patent No. 4690418) citing Japanese Publication No. JP 2004-505761. English translation provided by Kashiwabara International Patent Bureau.

Non-Final Office Action issued in cross-referenced matter U.S. Appl. No. 12/257,945 (U.S. Pub. No. 2010/0038830) on May 14, 2010.

Applicants' Response to Non-Final Office Action issued in cross-referenced matter U.S. Appl. No. 12/257,945 (U.S. Pub. No. 2010/0038830) on May 14, 2010 as filed on Nov. 12, 2010.
Notice of Allowance issued in cross-referenced matter U.S. Appl. No. 12/257,945 (U.S. Pub. No. 2010/0038830) on Jan. 11, 2011.
Notice of Withdrawal of Notice of Allowance issued in cross-referenced matter U.S. Appl. No. 12/257,945 (U.S. Pub. No. 2010/0038830) on Mar. 1, 2011.
Final Office Action issued in cross-referenced matter U.S. Appl. No. 12/257,945 (U.S. Pub. No. 2010/0038830) on Mar. 17, 2011.
Applicants' Response to Final Office Action issued in cross-referenced matter U.S. Appl. No. 12/257,945 (U.S. Pub. No. 2010/0038830) on Mar. 17, 2011 as filed on Jun. 17, 2011.
Petition Decision issued in cross-referenced matter U.S. Appl. No. 12/257,945 (U.S. Pub. No. 2010/0038830) on Jun. 30, 2011.
Restriction Requirement issued in cross-referenced matter U.S. Appl. No. 12/506,712 (U.S. Pub. No. 2010/0015447) on Sep. 22, 2010.
Applicants' Response to Restriction Requirement issued in cross-referenced matter U.S. Appl. No. 12/506,712 (U.S. Pub. No. 2010/0015447) on Sep. 22, 2010 as filed on Oct. 19, 2010.
Non-Final Office Action issued in cross-referenced matter U.S. Appl. No. 12/506,712 (U.S. Pub. No. 2010/0015447) on Dec. 23, 2010.
Applicants' Response to Non-Final Office Action issued in cross-referenced matter U.S. Appl. No. 12/506,712 (U.S. Pub. No. 2010/0015447) on Dec. 23, 2010 as filed on Mar. 23, 2011.
Non-Final Office Action issued in cross-referenced matter U.S. Appl. No. 12/506,712 (U.S. Pub. No. 2010/0015447) on May 24, 2011.
Non-Final Office Action issued in cross-referenced matter U.S. Appl. No. 11/763,842 (U.S. Pub. No. 2007/0237800) on Jun. 18, 2010.
Applicant's Response to Non-Final Office Action issued in cross-referenced matter U.S. Appl. No. 11/763,842 (U.S. Pub. No. 2007/0237800) on Jun. 18, 2010 as filed on Nov. 18, 2010.
Final Office Action issued in cross-referenced matter U.S. Appl. No. 11/763,842 (U.S. Pub. No. 2007/0237800) on Jan. 20, 2011.
Applicants' Response to Final Office Action issued in cross-referenced matter U.S. Appl. No. 11/763,842 (U.S. Pub. No. 2007/0237800) on Jan. 20, 2011 as filed on Apr. 20, 2011.
Advisory Action issued in cross-referenced matter U.S. Appl. No. 11/763,842 (U.S. Pub. No. 2007/0237800) on May 4, 2011.
Applicants' Request for Continued Examination as filed on May 20, 2011 in cross-referenced matter U.S. Appl. No. 11/763,842 (U.S. Pub. No. 2007/0237800).
Barrero, A. et al., "Micro- and Nanoparticles via Capillary Flows," Annu. Rev. Fluid Mech., vol. 39, pp. 89-106 (2007).
Binks, B. P. et al., "Particles Adsorbed at the Oil-Water Interface: A Theoretical Comparison between Spheres of Uniform Wettability and "Janus" Particles," Langmuir, vol. 17, pp. 4708-4710 (2001).
Casagrande, C. et al., "Janus Beads: Realization and Behaviour at Water/Oil Interfaces," Europhys. Lett., vol. 9, No. 3, pp. 251-255 (1989).
Cloupeau, M. et al., "Electrohydrodynamic spraying functioning modes—a critical—review," J. Aerosol Sci., vol. 25, No. 6, pp. 1021-1036 (1994).
Cloupeau, M. et al., "Electrostatic spraying of liquids—Main functioning modes," J. Electrostatics, vol. 25, pp. 165-184 (1990).
De La Mora, J. F. et al., "The current emitted by highly conducting Taylor cones," J. Fluid Mech., vol. 260, pp. 155-184 (1994).
Farokhzad, O. et al., "Nanoparticle-Aptamer Bioconjugates: A New Approach for Targeting Prostate Cancer Cells," Cancer Research, vol. 64, pp. 7668-7672 (2004).
Fridrikh, S. V. et al., "Controlling the Fiber Diameter during Electrospinning," Phys. Rev. Lett., vol. 90, No. 14, pp. 144502-1 to 144502-4 (2003).
Gomez, A. et al., "Charge and fission of droplets in electrostatic sprays," Phys. Fluids, vol. 6, No. 1, pp. 404-414 (1994).
Guo, K. et al., "Aptamer-based capture molecules as a novel coating strategy to promote cell adhesion," J. Cell. Mol. Med., vol. 9, No. 3, pp. 731-736 (2005).
Hicke, B. et al., "Tumor Targeting by an Aptamer," J. of Nuclear Med., vol. 47, No. 4, pp. 668-678 (2006).

Hohman, M. M. et al., "Electrospinning and electrically forced jets. II. Applications," Physics of Fluids, vol. 13, No. 8, pp. 2221-2236 (2001).
Hohman, M. M. et al., "Electrospinning and electrically forced jets. I. Stability Theory," Physics of Fluids, vol. 13, No. 8, pp. 2201-2220 (2001).
Huang, Z. et al., "A review on polymer nanofibers by electrospinning and their applications in nanocomposites," Comp. Sci. Tech., vol. 63, pp. 2223-2253 (2003).
Larsen, G., et al., "A Method for Making Inorganic and Hybrid (Organic/Inorganic) Fibers and Vesicles with Diameters in the Submicrometer and Micrometer Range via Sol-Gel Chemistry and Electrically Forced Liquid Jets," J. Am. Chem. Soc., vol. 125, pp. 1154-1155 (2003).
Loscertales, I. et al., "Electrically Forced Coaxial Nanojets for One-Step Hollow Nanofiber Design," J. Am. Chem. Soc., vol. 126, pp. 5376-5377 (2004).
Loscertales, I. et al., "Micro/nano Encapsutation via Electrified Coaxial Liquid Jets," Science, vol. 295, pp. 1695-1698 (2002).
Loscertales, I. et al., "Production of complex nano-structures by electro-hydro-dynamics," Mater. Res. Soc. Symp. Proc., vol. 860E, pp. LL5.9.1-LL5.9.6 (2005).
Marin, A. et al., "Simple and Double Emulsions via Coaxial Jet Electrosprays," The Amer. Phys. Soc., vol. 98, pp. 014502-1 to 014502-4 (2007).
Nie, Z. et al., "Janus and Ternary Particles Generated by Microfluidic Synthesis: Design, Synthesis, and Self-Assembly," J. Am. Chem. Soc., vol. 128, pp. 9408-9412 (2006).
Nisisako, T. et al., "Synthesis of Monodisperse Bicolored Janus Particles with Electrical Anisotropy Using a Microfluidic Co-Flow System," Adv. Mater., vol. 18, pp. 1152-1156 (2006).
Roh, K., et al., "Biphasic Janus Particles with Nanoscale Anisotropy," Nature Materials, vol. 4, pp. 759-763 (2005).
Roh, K., et al., "Triphasic Nanocolloids," J. Am. Chem. Soc., vol. 128, pp. 6796-6797 (2006).
Rosell-Llompart, J. et al., "Generation of Monodisperse Droplets 0.3 to 4 μm in Diameter from Electrified Cone-Jets of Highly Conducting and Viscous Liquids," J. Aerosol Sci., vol. 25, No. 6, pp. 1093-1119 (1994).
Shepherd, R. F. et al., "Microfluidic Assembly of Homogeneous and Janus Colloid-Filled Hydrogel Granules," Langmuir, vol. 22, pp. 8618-8622 (2006).
Shin, Y. M. et al., "Electrospinning: A whipping fluid jet generates submicron polymer fibers," Appl. Phys. Lett, vol. 78, No. 8, pp. 1149-1151 (2001).
Sun, Z. C. et al., "Compound Core-Shell Polymer Nanofibers by Co-Electrospinning," Adv. Mater., vol. 15, No. 22, pp. 1929-1932 (2003).
Takei, H. et al., "Gradient Sensitive Microscopic Probes Prepared by Gold Evaporation and Chemisorption on Latex Spheres," Langmuir, vol. 13, No. 7, pp. 1865-1868 (1997).
Uhrich, K. et al., "Polymeric Systems for Controlled Drug Release," Chem. Rev., vol. 99, pp. 3181-3198 (1999).
Zeleny, J., "Instability of electrified liquid surfaces," Phys. Rev., vol. 10, No. 1, pp. 1-6 (1917).
Berkland, Corey et al., "Controlling surface nano-structure using flow-limited field-injection electrostatic spraying (FFESS) of poly(D,L-lactide-co-glycolide)," Biomaterials, vol. 25, No. 25, pp. 5649-5658, (Nov. 2004).
Cayre, Olivier, et al., "Fabrication of Dipolar colloid Particles by Microcontact Printing," The Royal Society of Chemistry, 2003, pp. 2296-2297.
Erhardt, Rainer, et al., "Amphiphilic Janus Micelles with Polystyrene and Poly(methacrylic acid) Hemispheres," JACS Articles, J. Am. Chem. Soc., 2003, 125, pp. 3260-3267.
Erhardt, Rainer, et al., "Janus Micelles," Micromolecules, 2001, 34, pp. 1069-1075.
Perro, Adeline, et al., "Design and Synthesis of Janus Micro- and Nanoparticles," The Royal Society of Chemistry, 2005, 15, pp. 3745-3760.

Cayre, Olivier, et al., "Fabrication of Asymmetrically Coated Colloid Particles by Microcontact Printing Techniques," The Royal Society of Chemistry, 2003, pp. 2445-2450.

Roh, Kyung-Ho, et al., "Biphasic Janus Particles with Nanoscale Anisotrophy," Letters, Advance Online Publication, www.nature.com/naturematerials, pp. 1-5.

Paunov, V., et al., "Novel Technique for Preparation of Dipolar Microparticles by Polymerization of Polarised Emulsions," Abstract Central™, 1 page.

* cited by examiner

MULTI-PHASIC NANOPARTICLES

CROSS-REFERENCE TO RELATED APPLICATIONS

This application is a divisional of U.S. patent application Ser. No. 11/272,194 filed on Nov. 10, 2005, which issued as U.S. Pat. No. 7,767,017 and which claims the benefit of U.S. Provisional Application Ser. No. 60/626,792, filed on Nov. 10, 2004 and the benefit of U.S. Provisional Application Ser. No. 60/651,288, filed Feb. 9, 2005. The disclosures of each of the above applications are respectively incorporated herein by reference in their entireties.

FIELD OF THE INVENTION

The invention relates to a method of forming multi-phasic nanoparticles and to the nanoparticles formed thereof.

BACKGROUND ART

Electrified jetting is a process to develop liquid jets having a nanometer-sized diameter, using electro-hydrodynamic forces. When a pendant droplet of conducting liquid is exposed to an electric potential of a few kilovolts, the force balance between electric field and surface tension causes the meniscus of the pendent droplet to develop a conical shape, the so-called Taylor cone. Above a critical point, a highly charged liquid jet is ejected from the apex of the cone. This well-established process has been employed by two processes, i) electrospraying and ii) electrospinning. In electrospraying, the ejected liquid jet is eventually fragmented due to instabilities and forms a spray of droplets. Among the various applications, production of charged gas phase ions of biomacromolecules for mass spectroscopy is the most widely used. Using polymer solutions or melts as jetting liquids, electrospinning gives a way to develop fibers whose diameters are a few orders of magnitude smaller than those available from conventional spinning. Only during the last decade, electrospinning has witnessed increasing attention and nanofibers have been spun from a wide variety of polymers. In the last decade, electrospinning has witnessed increasing attention and nanofibers have been spun from a wide variety of polymers.

Recently several multi-component jetting systems have been reported employing capillaries with different geometries. Among those is a coaxial core-shell geometry, which has outer and inner liquid-feeding channels and which produces stable cone jets having sustained core and shell layers. Much less is known about alternative geometries of multi-component jetting such as a side-by-side configuration.

Anisotropic multi-phasic nano-objects possessing two distinct phases may establish significant advances in nanotechnology and may have broad impact in areas, such as microelectronics and biotechnology. The possibility of selective modification of each side of the biphasic object makes this system very attractive and versatile for electronic and biomedical applications.

Accordingly, there is a need for improved methods of forming nanometer sized particles and for multiphasic particles with unique chemical properties.

SUMMARY OF THE INVENTION

The present invention solves one or more problems of the prior art by providing in at least one embodiment a method of forming multiphasic particles by electrified jetting. The method of this embodiment involves the jetting of two or more different liquids in side-by-side capillaries thereby generating composite liquid stream having a multiphasic cone jet. The formed cone-jet is then exposed to a force field which causes the composite liquid stream to at least partially solidify into a nano-object.

In another embodiment of the invention, the multiphasic nano-object formed by the method set forth above is provided. For example, biphasic nanospheres or biphasic nanofibers can be produced using the method of the invention depending on the specific properties of the liquids used and on the working parameters. Appropriate selection of jetting liquids with control of the process parameters as set forth below allows biphasic nano-objects to be formed in a variety of morphologies such as nanofibers or nano-spheres. The biphasic objects include composite structures that are nanocrystals as well as structures with surfaces modified by selective reactions. The nano-objects of the invention are advantageously useful in many practical applications, such as photonic and electronic devices, storage devices, and biomedical materials.

BRIEF DESCRIPTION OF THE DRAWINGS

FIGS. 7A, B, and C are diagrams of the chemical reaction in an example of chemical modification.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "nano-object" as used herein means an object of any morphology having at least one spatial dimension on the order of several nanometers. In one variation, nano-objects have at least one spatial dimension from about 5 to about 5000 nm. In another variation, nano-objects have at least one spatial dimension from about 20 to about 2000 nm. In still other variations, nano-objects have at least one spatial dimension from about 50 to about 500 nm. Examples of such nano-objects include nano-spheres, nano-rods, and nano-fibers. Nano-spheres are nano-objects that are substantially spherical. Nano-rods are nano-objects that are substantially rod-shaped. Nano-fibers are nano-objects that have a long dimension that is larger than any dimension of the cross-section. "Nano-particle" is used to refer to a nano-object in which all three spatial dimensions are on the order of several nanometers. Again, in one variation, nano-particles have at least one spatial dimension from about 5 to about 5000 nm. In another variation, nano-particles have at least one spatial dimension from about 20 to about 2000 nm. In still other variations, nano-particles have at least one spatial dimension from about 50 to about 500 nm.

The term "nano-sized" or "nanometer-sized" as used herein means on the order of several nanometers. In one variation, nano-sized is from about 5 to about 5000 nm. In another variation, nano-sized is from about 20 to about 2000 nm. In still other variations, nano-sized is from about 50 to about 500 nm.

The term "structural component" as used herein means a compound of the nano-object that renders the nano-object solid.

Figure 1:
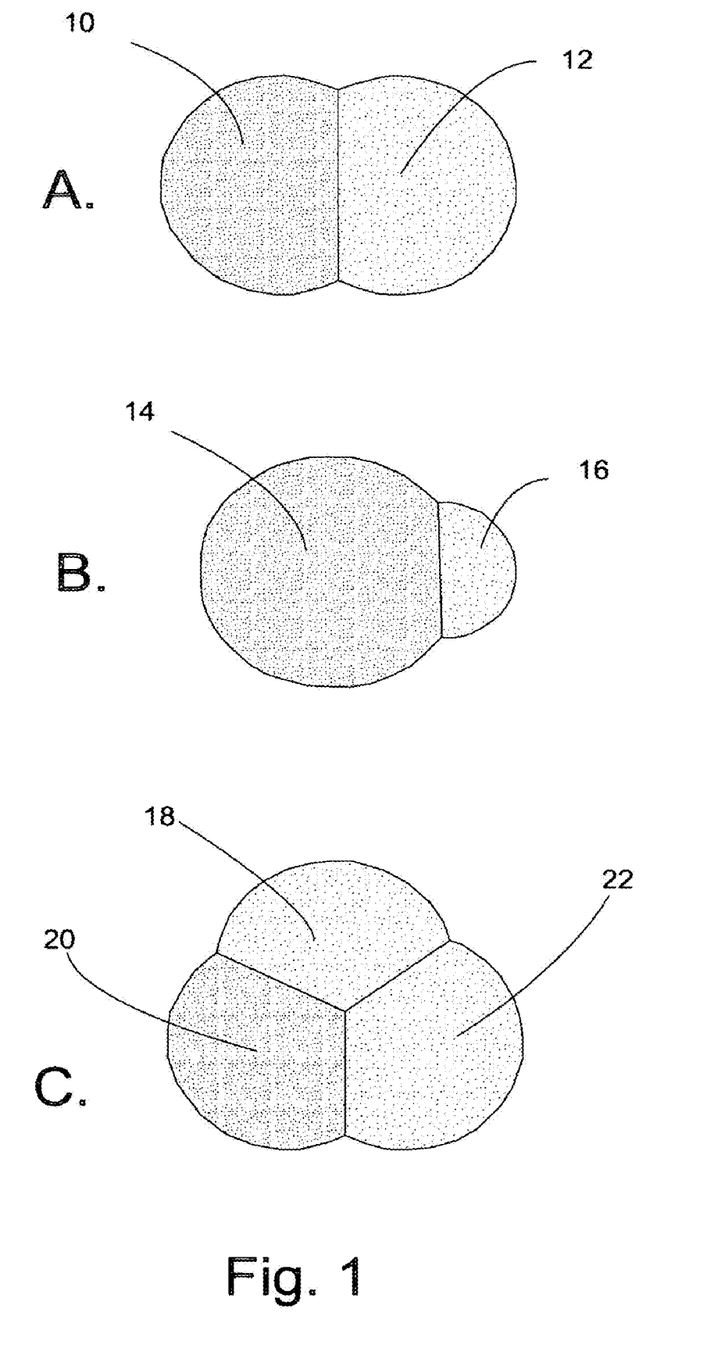
FIG. 1A is an illustration of a biphasic particle formed by the method of the invention.
FIG. 1B is an illustration of a biphasic particle formed by the method of the invention.
FIG. 1C is an illustration of a triphasic particle formed by the method of the invention.

In an embodiment of the present invention, an anisotropic nano-object having multiple chemically distinct sides is provided. With reference to FIGS. 1A, 1B, and 1C, variations of the nano-objects of the invention are provided. In FIG. 1A, a variation of this embodiment in which the nano-object is biphasic having two distinct phases 10, 12 of nearly equal size (with corresponding chemically distinct sides or surfaces) is illustrated. In FIG. 1A, another variation of this embodiment in which the nano-object is biphasic having two distinct phases 14, 16 of unequal size (with corresponding chemically distinct sides or surfaces) is illustrated. The differences in the relative sizes between phases in FIGS. 1A and 1B is due to the differences in thermodynamic equilibria present between the composite particles in FIG. 1A versus FIG. 1B. In other variations, the nano-object has three or more distinct phases with multiple chemically distinct sides. FIG. 1C provides an illustration of a nano-object having three phases 18, 20, 22. In each variation, a number of morphologies are possible. For example, the nano-object may be a multiphasic nano-particle, a multiphasic nano-sphere, a nano-rod, or a nano-fiber. The nano-object multiple phases in certain variations have parallel alignment. In one variation of this embodiment, the nano-object is characterized by one or more spatial dimensions (of the three possible) between 5 nm and 5000 nm. In another variation, the nano-object is characterized by one or more spatial dimensions between 20 and 2000 nm. In yet another variation, the nano-object is characterized by one or more spatial dimensions between 50 and 500 nm.

In another embodiment of the present invention, the nano-object consists of multiple chemically distinct phases. In some variations, these chemically distinct phases are polymer phases. In a further refinement of this embodiment, at least one of these phases contains additional additives, for example inorganic nanocrystals, quantum dots, biomolecules, colorants (e.g. dyes, pigments, etc), cross-linkers, pharmaceutical compounds, molecular probes, and molecules that enable drug delivery (e.g., targeted or untargeted). In another refinement, the multiple phases comprise two or more phases which may, for example, contain the same polymer, but differ in the additives added to the phase. One of the phases may contain, for example, a polyether such as a polyethyleneglycol, or a biodegradable polymer such as a polylactic acid, a polycaprolactone, or a polyglycolic acid. One of the phases may contain a redox-active material, a conducting material, or a material with chemical groups that can react after the particles are produced. Such subsequent reactions include cross-linking. Such cross-linking is thermally induced or actinic radiation induced (e.g., photochemically induced). Moreover, the cross-linking may also include immobilization of biomolecules. The biomolecules may, for example, be those which bind to a biological target such as a cell membrane component, a cell receptor, or an extracellular matrix component. In some embodiments, the nano-object may comprise nanoparticles which have at least one phase that senses a biological target, or at least two phases which sense distinct biological target molecules. For example, such a sensor may sense a cell surface receptor, or a component of the extracellular fluid. The phase that senses a receptor on a cell wall may be coupled to a signaling mechanism, for example a signaling mechanism which comprises fluorescent resonance energy transfer. The phase that attaches to a receptor of a cell may be coupled to a signaling mechanism, and the nanoparticle may comprise at least one phase designed so as not to attach to a cell wall. In a further refinement, the nano-object may create an electrical potential in response to a light pulse, for example an electrical potential comparable to a typical cell potential. The nano-object may have a preferential alignment towards a cell, so that a cell potential is applied.

In another embodiment of the present invention, a method of forming the multiphasic nano-objects is provided. The method of this embodiment represents an improvement of the electrospraying and electrospinning techniques of the prior art in that nano-objects with multiple chemically distinct surfaces are formed in some variations. In the method of this embodiment, two or more liquid streams (including liquid jets) are combined together such that the two or more liquid streams contact over spatial dimensions sufficient to form a composite liquid stream having a multi-phasic cone-jet of nanometer sized dimensions. In some variations, the liquid streams are electrically conductive. The composite liquid stream, and in particular the cone-jet, is exposed to force field sufficient to solidify the composite liquid stream (i.e., the cone-jet) into the nano-objects having multiple chemically distinct chemical surfaces. In some variations, the liquid stream fragments in droplets lead to nano-particle, nano-sphere, or nano-rod formation.

Figure 2A:
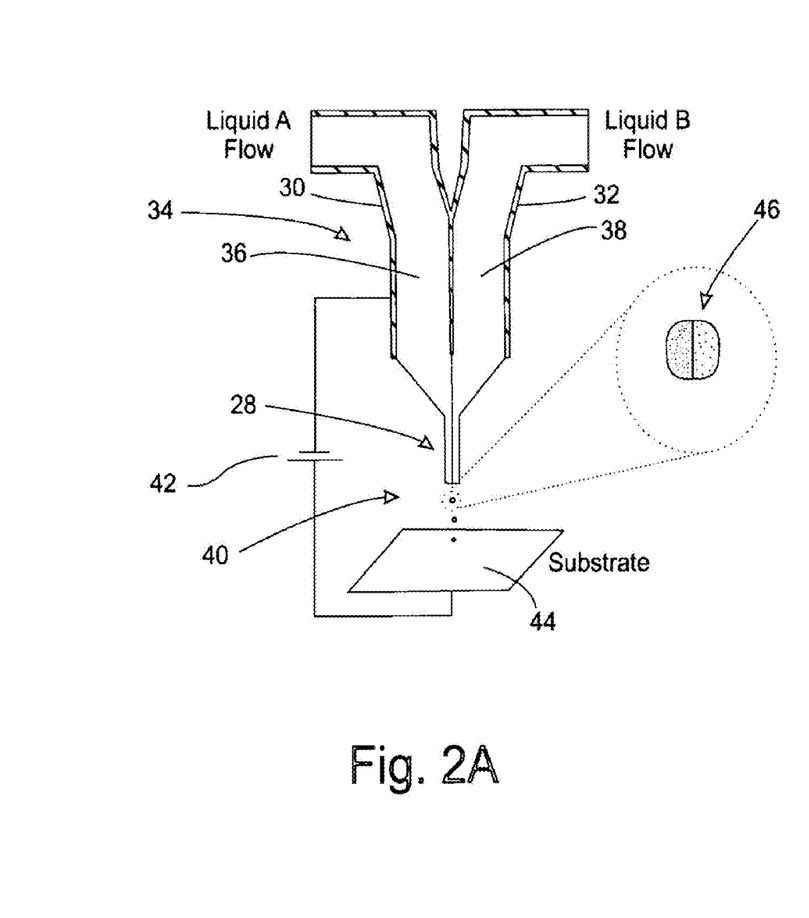
FIG. 2A is a schematic of an apparatus of an embodiment of the invention for forming nanometer sized particles by electrospraying.
Figure 2B:
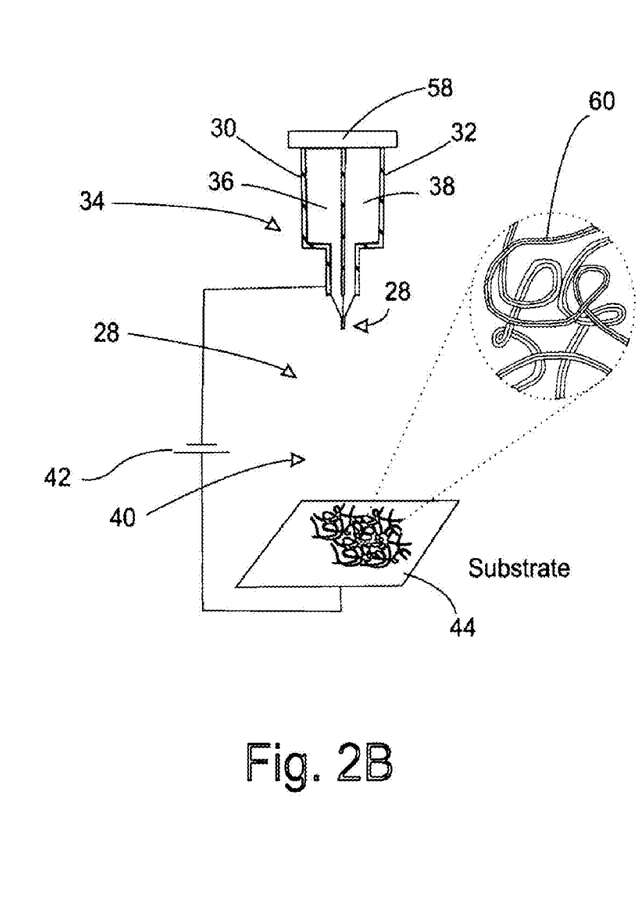
FIG. 2B is a schematic of an apparatus of an embodiment of the invention for forming nanometer sized fibers by electrospinning.
Figure 3:
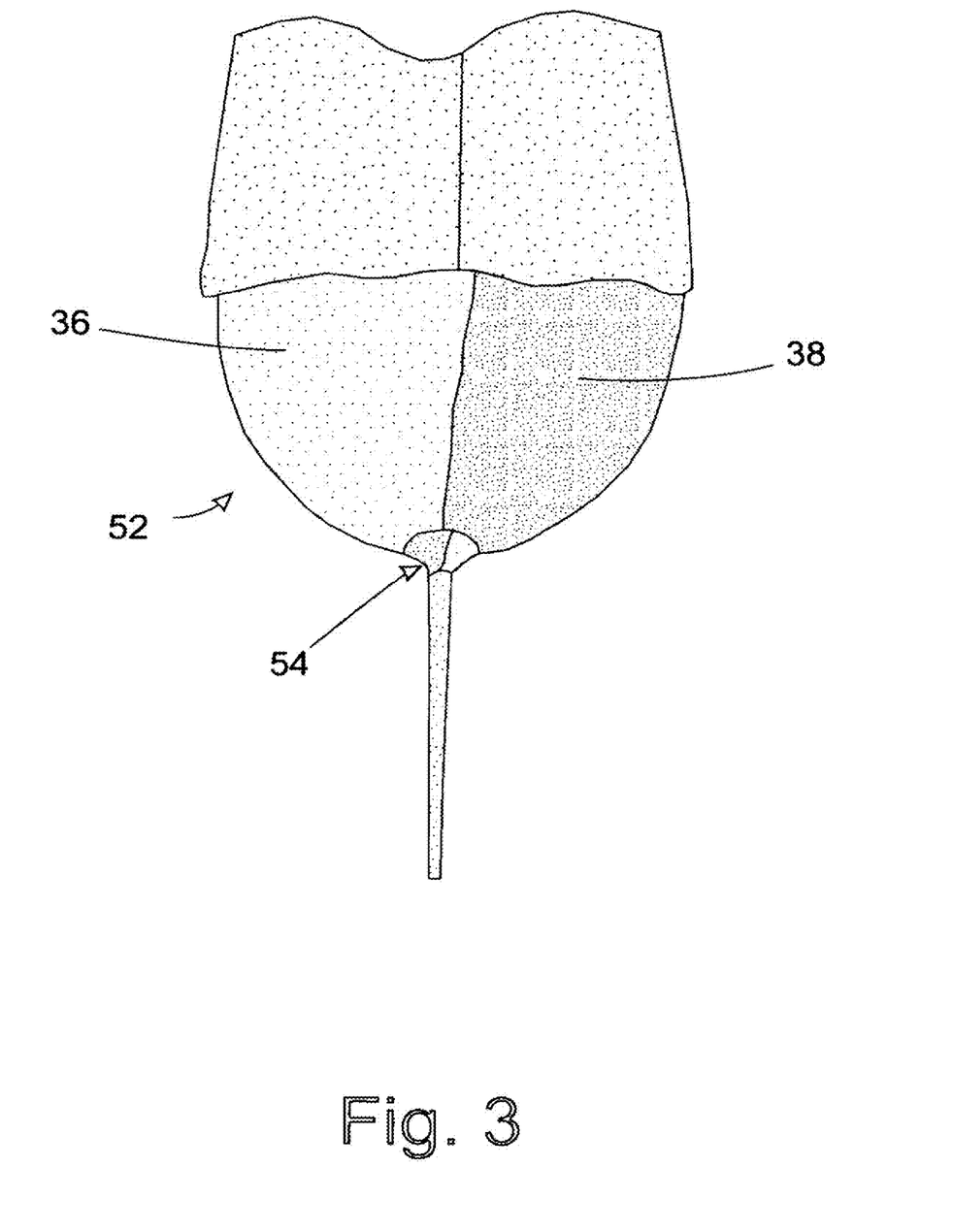
FIG. 3 is a schematic illustrating the Taylor cone.

With reference to FIGS. 2A and 2B, schematics illustrating a side-by-side electrojetting apparatus implementing a variation of the method of the invention are provided. FIG. 2A is a schematic of an electrojetting apparatus of the present embodiment in which two jetting liquids are combined to form biphasic particles. FIG. 2B is a schematic of an electrojetting apparatus of the present embodiment in which two jetting liquids are combined to form biphasic fibers. In order to incorporate two different components in each side of the composite stream 28, channels 30, 32 are configured adjacent to each other (i.e., side by side) in nozzle 34. In same variations, channels 30, 32 are capillaries. Channels 30, 32 feed two different jetting liquid streams 36, 38 into region 40 having an electric field generated by power supply 42. Channels 30, 32 are of sufficient dimensions to allow contacting of liquids streams 36, 38 to form composite stream 44. In one variation, this electric field is generated by the potential difference between nozzle 34 and plate 46. Typically, an electric field is formed by applying a potential difference between at least two electrodes from about 0.1 kV to about 25 kV. It will be appreciated by one skilled in the art that various configurations of plates and geometries may be used to generate the electric field, and therefore are within the scope of the present embodiment. FIG. 2A illustrates the electrospraying variation of the present invention in which particles 48 are formed. In this variation, ejected composite stream 28 is fragmented due to instabilities thereby forming a spray of droplets. FIG. 3B illustrates a variation in which nano-fibers are formed when polymer solutions or melts are used as jetting liquids, fibers 58 are obtained. In FIG. 3B syringe pump 60 is used to drive the liquids in nozzle 34.

With reference to FIG. 3, a schematic of the cone-jet formation is provided. Although the present embodiment is not restricted to any particular mechanism for forming the resultant biphasic objects, it is believed that the generation of a jet in which jetting liquids 36, 38 maintain their side-by-side configuration and in which jet 50 is ejected from apex 50 of cone-shaped pendent droplet 52. When pendant droplet 52 is exposed to an electric potential of a few kilovolts, electrohydrodynamic forces act to break the liquids apart. Specifically, the force balance between the electric field and surface tension of pendant droplet 52 causes the meniscus of pendant droplet 52 to develop conical shape 54 (referred to as a "Taylor cone"). Above a critical point, a highly charged liquid is ejected from the apex of the cone.

As schematically presented in FIGS. 2A, 2B, and 3, the biphasic jet which is ejected by the stable biphasic cone can be either fragmented to biphasic nanodroplets or can solidify into biphasic nanofibers. The two phases, i.e., the two jetting liquids (or solutions), can either be compatible with each other or not. However, when two polymer solutions are compatible each other, the most ideal case for a stable cone-jet and for a stable interface between the two phases is present. In such situations, the process is not thermodynamically but rather kinetically controlled, resulting in one phase being trapped in each side before they mix with the other phase. Moreover, the compatibility between the two phases is desirable in terms of the stability of the interface.

Morphological control is an important feature of the present invention. Therefore, composite liquid stream 28 which is ejected from the pendant cone 54 can either be fragmented to small droplets or be sustained and elongated in the form of a continuous fiber. The size of the droplet and diameter of the fibrous jet can also be controlled. Such control is attained by changing either the material properties of jetting liquids or the working parameters of electrified jetting that break-up the jet. It should be appreciated, however, that the final morphology of the liquid jet is not always the same as those of the solid products collected on the substrates. The shape of final products is best controlled by a well-defined sol-gel transition. When the method of the invention is used to form fibers (i.e., electrospinning), this sol-gel transition is intrinsic to the process, since the jetting liquids are polymer solutions or polymer melts, solvent evaporation or a temperature drop below the thermal transition temperature during the jetting acts as a sol-gel treatment step.

Figure 6:
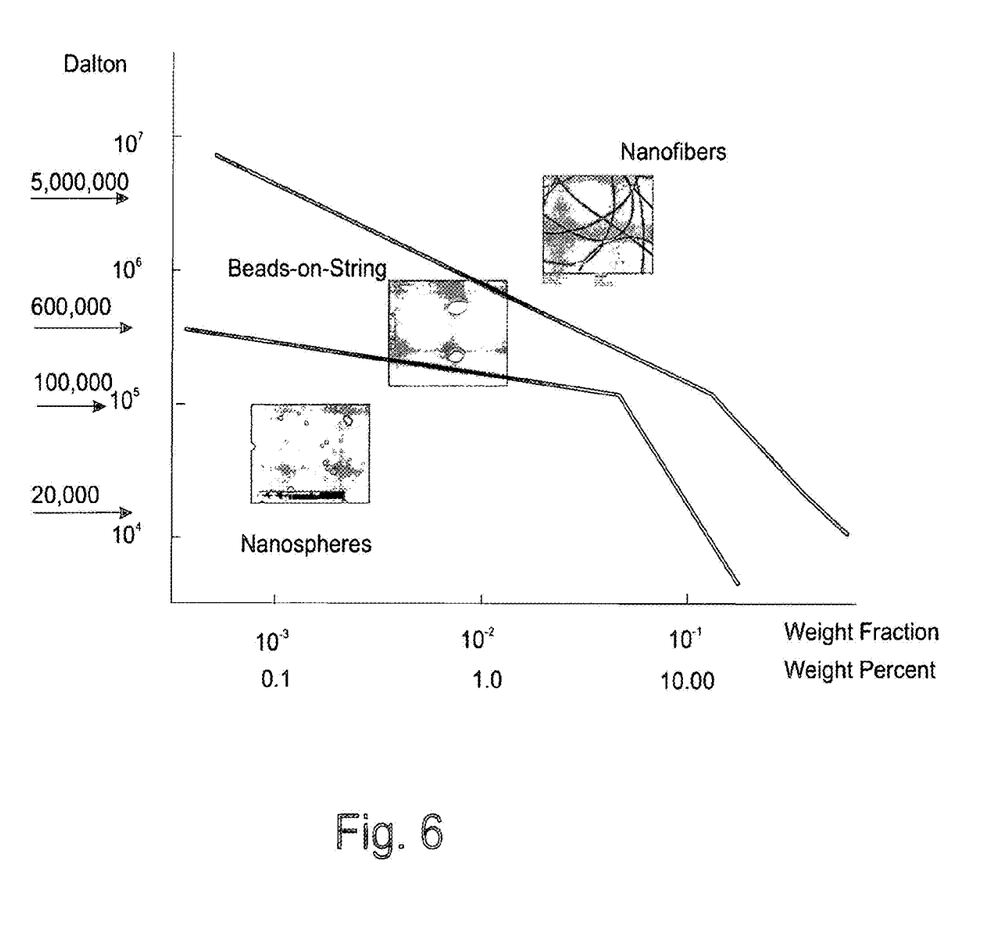
FIG. 6 is a diagram showing the relationship of molecular weight and concentration to morphology.
Figure 7:
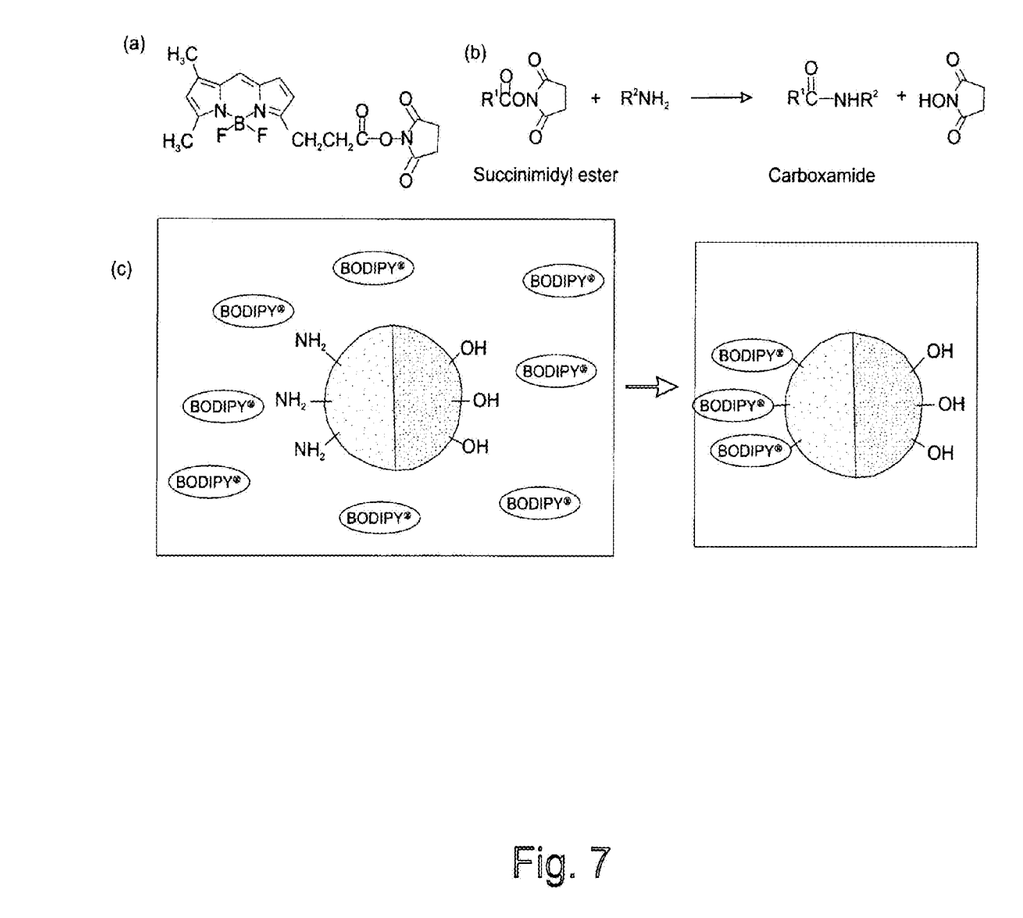

Since the electrified jetting methods of the invention rely to a great extent on electrohydrodynamic processes, the properties of the jetting liquid and operating parameters are closely related to each other. Moreover, when the jetting liquids are not one-component systems (i.e., mixtures of two or more compounds), the jetting liquid is a solution having properties governed by several parameters of the solvent and solutes. It should be appreciated that, liquid properties, solution parameters, and operating parameters are interconnected in the methods of the present invention. Relevant material properties include viscosity, surface tension, volatility, thermal and electrical conductivity, dielectric permittivity, and density. Relevant solution properties includes concentrations, molecular weight, solvent mixtures, surfactants, doping agent, and cross-linking agents. Finally, relevant operating parameters are flow rate of the liquid streams, electric potential, temperature, humidity, and ambient pressure. With regard to the operating parameters, the average size and size distributions of the droplets in electrospraying with cone-jet mode are known to be highly dependent on the flow rate (pumping rate of the jetting liquids). At a fixed flow rate, the size distributions consist of one or several relatively monodisperse classes of diameters. At minimum flow rate, the modality of the distributions and diameter of the droplet itself also show their minima. When the flow rate is changed, the electric field should be adjusted by changing either distance or electric potential between the electrodes in order to sustain a stable cone-jet mode. Higher flow rate should be accompanied by a higher electrical field for mass balance of jetting liquids. When the diameter of droplets are not small enough, solvent evaporation cannot be complete before the droplets reach the collecting substrate, so the resulting droplets are wet and flat. FIG. 6 described below provides a sense of the interaction of the weight average molecular weight versus concentration in determining morphology.

In order to produce fine droplets, the jetting liquids should be fragmented before they solidify. For this purpose, jetting liquids can be a very dilute polymer solution with extensional viscosity that does not show much strain hardening. However, depending on the molecular weight of the polymer, this concentration range is sometimes too low for particle production. Accordingly, in some variations, an alternative is to use low molecular weight compound as the jetting liquid. In such variations, the droplets are in a liquid phase at the point of collection. Accordingly, the appropriate sol-gel chemistry is necessarily employed after or during the process of jetting. In some variations, the resultant nano-object of the jetting is cross-linked thereby having an insoluble network structure. The cross-linking reaction of the prepolymer will be initiated by an appropriate method (e.g., thermal initiation or UV illumination).

In yet another embodiment of the invention, multi-phasic nano-objects with selective chemical modification are provided. In this embodiment, the nano-objects are formed from one or more liquid streams that include one or more reactive components that react with a structural component (i.e., a polymer) thereby rendering a resulting surface of the multi-phasic nano-objects chemically modified as compared to the surface when the one or more reactive components are not present. Moreover, the liquid streams in this embodiment may include components such as inorganic nanocrystals, quantum dots, biomolecules, colorants (e.g. dyes, pigments, etc), cross-linkers, pharmaceutical compounds, molecular probes, and molecules that enable drug delivery (e.g., targeted or untargeted). For example, during the formation of biphasic particles, reactive functional groups will be incorporated by adding appropriate components in each side of the jetting solution. After biphasic jetting, the surface of the object will have different functional groups in each side. In some variations, the different phases in this embodiment are detected by either fluorescent or electron microscopy. This example is analogous extended to the case of when more than two streams are used.

As set forth above, a number of additives may be included in the various phases of the nano-objects of the invention. Therefore, such additives must also be included in one or more of the liquid streams used to form the nano-objects. In one variation, quantum dots which have specific electronic, magnetic, optical or biomedical properties on only one side of a nano-sphere or nanofiber may be incorporated. In another variation, the multiphasic nano-objects of the invention are used in a drug delivery system, as cellular probes for in-vitro and in-vivo experiments, or as a platform for in-vivo biosensors with drug targeting capability. In the case of biphasic nano-objects, the intrinsic complexity of the biphasic character endows these objects multifunctionality. When one phase of the object is exploited for cell targeting, recognizing or sensing, the other can be used for drug loading and/or probing. In addition, one of the most attractive features of this system is relatively low cost and ease of production for this multifunctionality. Similarly, the use of two different cell-specific antibodies could be used to orient cells in a tissue-like fashion. Quantum dots are emerging new materials for biological labeling and are rapidly substituting traditional organic colorants and fluorescent proteins due to their unique characteristics such as high luminescence and long stability. These quantum dots can be encapsulated in or selectively attached to the biphasic object. Probing and sensing will be accomplished by combining the biphasic character and an appropriate physical mechanism (e.g. fluorescent resonance energy-transfer, FRET). For sensors or probes based on FRET, size control and interface design between the donor and acceptor considering the Föster distance will be the critical issue.

Figure 4:
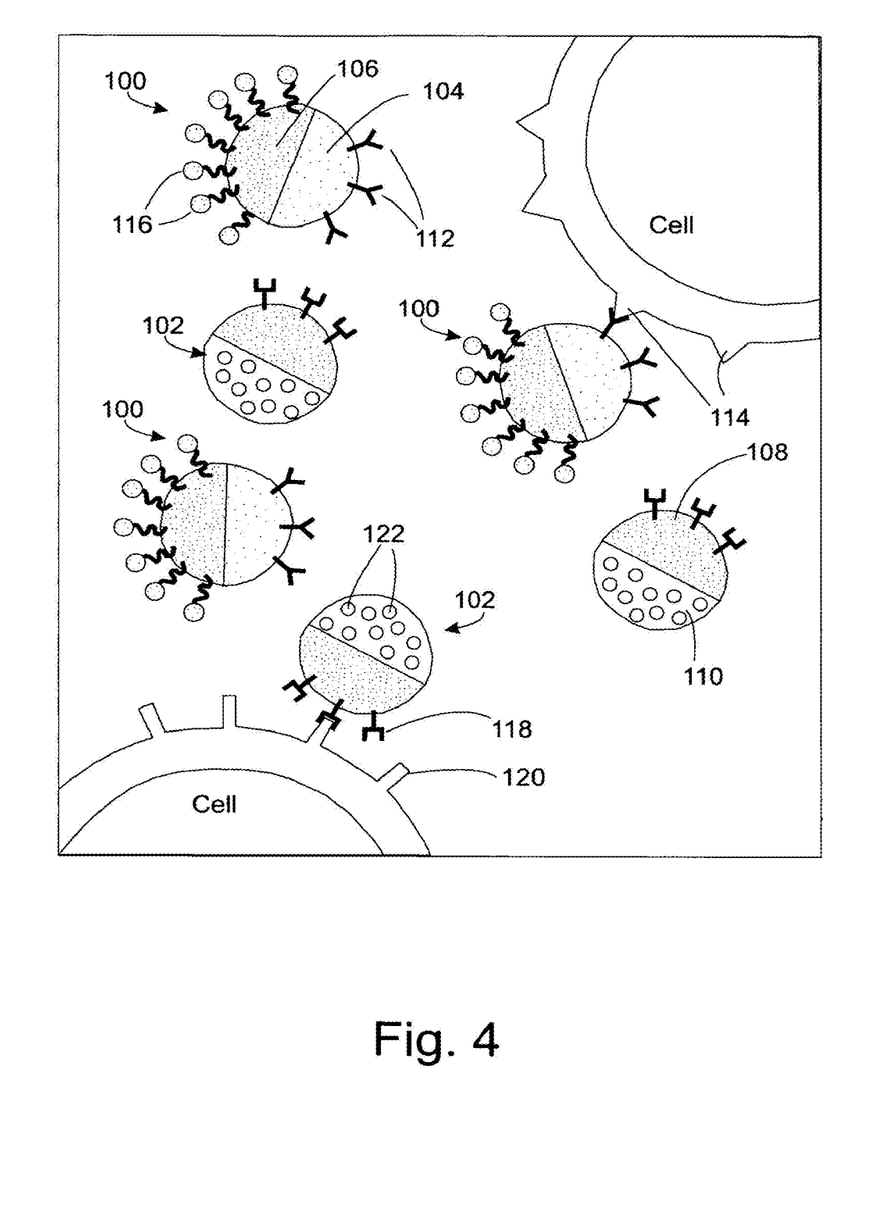
FIG. 4 is a schematic describing the recognition of multifunctional biphasic particles to specific cell types.

With reference to FIG. 4, a schematic describing the recognition of multi-functional biphasic particles to specific cell types is provided. In this illustration, two different types of nanoparticles 100, 102 are used. Particles 100 includes phases 104, 106 while particles 102 include phases 108, 110. Receptor 112 for first cell target 114 is attached to phase 104 while component 116 is attached to phase 106. Component 116 may be a drug. Similarly, receptor 118 for second cell target 120 is attached to phase 108. Particles 102 also include quantum dots 122 within phase 110.

It should also be appreciated in the applications set forth above, that as the size of the object becomes smaller down to the sub-micron scale, due to the increased surface-to-volume ratio, many of the characteristics of the objects are dominated by the structure and composition of the surface. Therefore, potential applications for drug delivery will greatly benefit from specific surface reactions that will allow immobilization of cell-specific antibodies.

Figure 5:
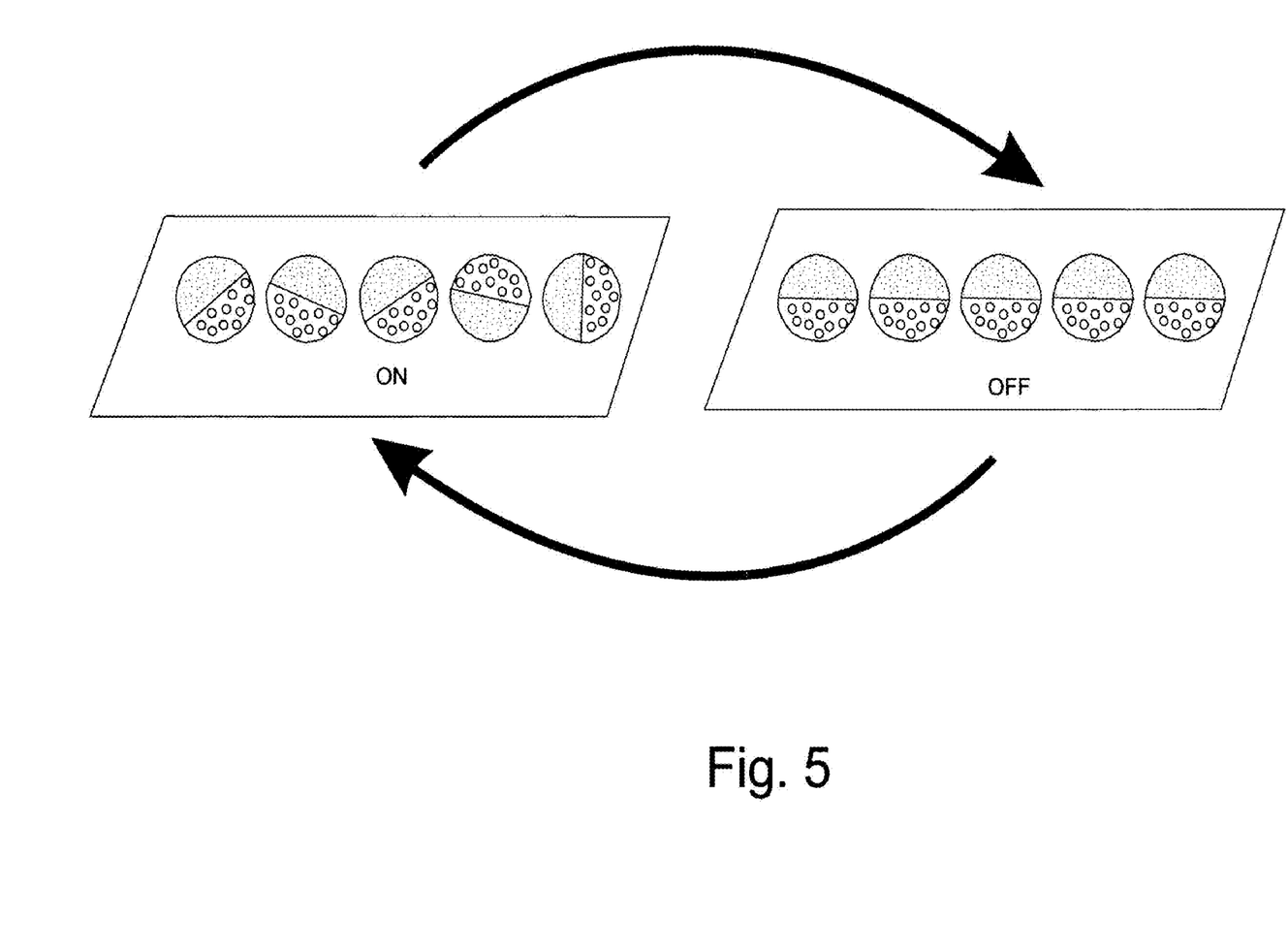
FIG. 5 is a schematic illustrating the functioning of a display based on biphasic monolayers.

In another embodiment of the present invention, biphasic nano-spheres made by the methods set forth above are used as building blocks for hyperstructures. For example, a monolayer of biphasic nano-spheres can act as a switchable surface which responds to the application of an external force field (electric or magnetic) FIG. 5 is a schematic illustrating the functioning of a display based on biphasic monolayers. In FIG. 5, switchable nano-objects may be achieved in several ways. In one variation, one phase of the nano-object is loaded with magnetic particles thereby creating a structure that is switchable with a magnetic field. In a second variation, electron donors are included in one phase and electron acceptors in a second phase to produce a dipole moment which may be switched with an electric field. In each of these variations, a display may be formed by incorporating a suitable colorant in each phase. Therefore, for example if triphasic nano-objects are utilized with each phase having a colorant for one of the three primary colors, a display that can attain nearly every color can be obtained.

When polymer solutions are employed as jetting liquids, roughly three different regimes can be designated for electrified jetting depending on the polymer concentrations. At the two extreme concentration regions, i.e. very dilute concentration (below overlap concentration, c*) and fairly concentrated concentration (above c*), jetting can be categorized as electrospraying and electrospinning, respectively. Very dilute polymer solutions are similar to low molecular weight liquids (usually solvents) in terms of viscoelasticity. The capillary break-up of the jet occurs easily to form droplets, so as to produce unimolecular macromolecule ions as in the case of application of mass spectrometry. However, at higher concentrations, the capillary break-up of the jet is difficult to achieve due to the strain hardening of the polymer solution in elongational flow. During this persistence, solvent evaporation is accelerated by the elongation of the jet and eventually the jet solidifies as a fine fiber.

In another embodiment of the present invention, a method of forming multiphasic beaded fibers is provided. It is observed that at intermediate concentrations, polymer solutions can form beaded fibers when electro jetted. In the present embodiment, two or more streams of polymer solutions are combined together at a nozzle such that the two or more streams contact over spatial dimensions sufficient to form a composite liquid stream having a cross-section of nanometer sized dimensions. At least a portion of the composite liquid stream is exposed to an electric field sufficient to fragment the composite liquid stream into beaded fibers. Sometimes the beaded fiber structure is referred to as "beads-on-string" morphology. Poly(ethyleneoxide)(PEO) solutions are exemplary solutions showing this morphology. This unique structure is believed to be the result of competition between the elongational force of the electric field and the surface tension of the jetting liquid. Since the size and shape of the beads and string can be controlled by adjusting various liquid parameters and operating parameters. Viscosity, charge density, and surface tension of the jetting solutions are factors affecting this morphology. Viscosity and surface tension of solutions are changed by solution parameters such as the molecular weight of polymer, concentration, and addition of other components such as co-solvents and surfactants. Charge density can be controlled by the addition of doping agents (i.e. ionizing salt) and operational parameters such as electrical potentials and neutralizing ion generation.

In another embodiment of the present invention, a method of making multi-component polymer mixtures of electron donors and acceptors is provided. Analogous bulk heterojunctions have several limitations. In the bulk materials, some regions made by random blending are too large for excitons to diffuse to the interface, and carrier phases are often interrupted before they reach the electrode. The nano-fibers of the present embodiment in one variation are biphasic. These nano-fibers have enhanced generations of heterojunctions between electron donors and acceptors as compared to conventional blending systems. Theoretically almost every exciton generated by both phase can reach the interface before recombining. Accordingly, the heterojunction interfaces realized by the biphasic nano-fibers of this embodiment improve the exciton-splitting process. In contrast, our biphasic nano-fibers have a controllable phase dimension, whose diameter can go down to tens of nanometers. So theoretically almost every exciton generated by both phase can meet the interface before it recombines. These pseudo-molecular level heterojunction interfaces realized by the biphasic configuration of nano-fibers will give a novel way to improve the exciton-splitting process more than ever. Additionally, since each phase forms a one-dimensional object, each acts as charge carrier, uninterrupted by the other until it contacts the electrode.

In still another embodiment of the present invention, donor/acceptor structures with a biphasic architecture are provided. In this embodiment, inorganic nanoparticles are incorporated as photoactive carriers. These inorganic nanoparticles are used because of their electrical conductivity (necessary for efficient charge separation). Moreover, these materials have electrical and optical properties that can be adjusted by varying the particle size and form densely packed layers. Finally, such materials are environmentally more stable than many colorants or proteins. Examples of useful inorganic materials include CdTe and CdS nano-particles. These materials have been shown to be an excellent source of photo-potential and used in solar cells. Moreover, these junctions exhibit one of the highest photopotentials observed for photoactive thin films. Because the energy of the valence and conduction bands in nano-particles can be controlled by varying their diameter, one can further increase the photo-potential by selecting CdS and CdTe nano-particles with optimal position of energy levels in respect to each other. The optical and electronic properties of CdTe and CdS nano-particles can be changed gradually by varying their diameter. As the particle size decreases, the energy gap between the top of the valence band ("VB") and the bottom of the conduction band ("CB") increases, which is termed the quantum size effect. The ability to vary the relative position of the CB and VB of CdTe and CdS is essential for maximization of charge separation in the biphasic nano-objects. Aqueous solutions of CdTe and US nano-crystals capped with thioglycolic acid or citrate ions are readily prepared.

In still another embodiment of the present invention, the anisotropic particles may also be integrated in layered shell structures, films, or castings. This is useful to generate two or three dimensional architecture. Moreover, a graded profile of conduction band energies which are formed by LBL. Such layered shell structures, films or castings may enable withdrawal of electrons from the interface with polymers to prevent charge recombination. 2D films of semiconductor nano-particles with properly positioned HOMO and LUMO to drive interracial photogenerated charge separation may be formed in this manner. Example of useful systems exhibiting this phenomenon are CdS and CdTe because of the proper positioning of their energy spectrum.

In yet another embodiment of the present invention, a multiphasic colorant ("MPC") made by electrojetting is provided. The MPC's of this embodiment have a wide range of optical properties. The optical properties of the MPC's are determined by the type and concentration of colorant molecules in the additives that are included in the MPCs. Specific additives are known to those skilled in the art and include, but are not limited to dyes and pigments such as, low-molecular weight dyes, such as laser dyes, textile dyes, paints, coatings, plastic colorants, metal colorants, ceramic colorants, fluorescence dyes, natural dyes, polymeric dyes, inorganic or organic pigments, or mixtures thereof. Moreover, the surface properties of each phase of the MPC can be tailored to change the overall properties of the MCPs. By variation the concentrations of colorants in the phases of the MCPs and by including colorants for each of the primary colors, MCPs of virtually any color are obtained. Moreover, the MCPs of this embodiment produce additional optical effects such as sheen, angular color variations, and translucency, if desired.

Single phase colorants are made by electrified jetting with a single nozzle setup through which a jetting liquid is fed. The jetting liquid is a mixture of structural components, colorants, and solvent(s) that can dissolve all the components. Structural components include polymers that are compatible with electrospraying or electrospinning. The structural components and the colorants typically form a single phase colorant in a form of homogeneous mixture after the jetting process. The components can or cannot be thermodynamically compatible to each other. In the jetting process accompanying solvent evaporation and size reduction, even incompatible components can form one-phasic colorant by kinetic entrapment.

In a variation of this embodiment, side-by-side dual capillaries can be used for the electrified jetting process to create two-phasic colorants (FIG. 3). Through each jetting capillary (nozzle), two chemically distinct jetting liquids are fed into a region having a force field present, and in particular an electric field. Each of the two jetting liquids can be composed of all the components typically used in one-phasic colorant production. In order to induce distinct characteristics in each phase, different dopants (colorants and additives) are incorporated for each jetting liquid. The structural components (i.e., the polymer or polymer solution) for each liquid stream may be the same or different. In a further refinement, alternative colorants may have a core-shell geometry. In other variations, the colorants are set into their final geometry by a post-treatment step, such as thermal annealing or treatment with light or other forms of energy.

In another variation of the present invention, three different phases are incorporated in one multi-phase colorant by use of three jetting liquids that are fed through three jetting capillaries. In this variation, the geometry of the three capillaries can be varied in several different ways. In one variation, the capillaries are triangularly arranged. In this case, three different dopant mixture systems can be incorporated in each of the three phases, all of which are exposed to the periphery of the colorants. In another variation, the capillary geometry is created by inserting side-by-side dual capillaries into an outer capillary. This combined geometry of biphasic and core-shell jetting produces biphasic colorants with interesting internal materials distribution. For example, if the two inner (core) liquids are used for inducement of colorants and additives, the resulting colorants would behave like the biphasic colorants. The third outer (shell) liquids can be used for an inducement of encapsulating layer, which can protect the colorants from the incompatible media and/or can enhance the suspending capability of the colorants by controlling the surface characteristics of the colorants.

The present embodiment also embraces colorants with more than three phases. Extension of the biphasic and triphasic electrified jetting uses more than three jetting capillaries for employing more than three phases into the colorants. In order to ensure that all the jetting liquids are involved in the production of every colorant, i.e., in order to prevent the case that each colorant is composed of a different combination of phases, the geometry of the capillaries is just that the jet is ejected out from the junction point of all the jetting liquid phases in the Taylor cone.

In other variations of this embodiment, colorants with non-spherical shapes are prepared. As set forth above, the electrified jetting process is governed by complex parameter windows. Variation of these parameters, allows the cone-jet mode that is appropriate for the multi-capillaries jetting, among various jetting modes. Variation of these parameters, also allows control of the shape of the resulting nano-objects. FIG. 6 shows an example how the morphology can be controlled by changing two independent solution parameters (concentration and molecular weight of the structural polymer). In this case, use of higher concentrations and larger molecules makes viscosity of the jetting solution higher so that the resulting morphology becomes more fibrous. For the same jetting liquids, use of different operating parameters also change the resulting morphology. The possible geometry of the colorants include spherical nano/micro-particles, ellipsoidal particles, nano/micro-rods, beads-on-a-string, nano-fibers, and etc.

In yet another variation of this embodiment, white colorants with application in white, opaque paints (i.e., white pigments without $TiO_2$) are provided. In one refinement, white colorants that are made of purely organic materials are prepared by the methods set forth above. A white color (low density), is generated by combining three or more organic dyes in one colorant, instead of using heavy and abrasive inorganic $TiO_2$ particles. The dyes may be a combination of the primary colors. These dyes can be either mixed together in one-phasic colorants or incorporated in each phase of multiphasic colorants. For example, triphasic colorants include fluorescent dyes that have an emission wavelength range of three additive primary colors (i.e., blue, green and red). In this example, each phase includes one color dye. When these colorants are illuminated with a fluorescent lamp, the three dyes in each phase emit their colors and the additive primary colors produce white-colored light.

The MCP of the present embodiment are useful for electronic display applications. Electronic displays are created by controlling the relative orientation of MCP's to the surface and to each other. The change in orientation is due to the influence of a controllable, external force field. In response to the switching of the field, re-orientation of at least a part of the MCP's is observed, which results in a change in optical properties of the display pixel. Each pixel consists of at least one MPC's. With such a technology, changes in the surface properties can be amplified to induce changes in color, as it is needed for advanced color displays.

The following examples illustrate the various embodiments of the present invention. Those skilled in the art will recognize many variations that are within the spirit of the present invention and scope of the claims.

EXAMPLE 1

Biphasic Jetting

The experimental setup for the present experiment conforms with that of FIG. 3. Two jetting liquids are fed using a dual syringe applicator assembly (FibriJet® SA-0100, Micromedics, Inc., MN, USA). In this setup, two 1 ml syringes are controlled by one syringe pump. Each syringe is filled with separate jetting solutions. These two syringes are connected to a dual channel tip ((FibriJet® 20SA-0105, Micromedics, Inc., MN, USA) which has a dual cannula with a dimension of 26 gauge and 3 inch length. These dual cannula or capillaries are covered with a transparent plastic tube that ties these two capillaries in side-by-side fashion. In order to avoid the capillary pressure caused by the groove between the two round shape cannula and create a stable biphasic pendent droplet from the side-by-side capillary setup, the tip end level is made even by the sharp cutting of the two capillaries and the plastic tube.

In this example, ideal conditions for biphasic jetting are considered. Specifically, the material properties for each liquid are similar. Compatibility between the two jetting solutions is necessary to achieve a stable interface between the two phases, and basic components (i.e. polymer and solvent) need to be the same. However, each side includes a different contrasting component to create an identifiable characteristic (e.g., fluorescent dyes for confocal microscopy or molecules with different electron density for TEM), which must be maintained in each phase throughout the process. Diffusion of these contrasting components from one phase to the other must be avoided until the point of solidification. In line with the above mentioned objectives, mixtures of PEO and macromolecular fluorescent dye dissolved in water are selected for each side of jetting solution. PEO (average molecular weight 600,000), fluorescein isothiocyanate-dextran (FITC-Dextran, average molecular weight 250,000), and Rhodamine B-dextran (Rho-Dextran, average molecular weight 70,000) are purchased from Aldrich Co. (USA). Jetting 15 is performed with solutions which are composed of 3% of PEO and 0.5% of each fluorescent-dextran by weight for each side of the jetting solution. 8 kV of electric potential is applied between 25 cm separation of the electrodes. A glass slide is covered with aluminum foil except about 80% of the surface of one face, and the jetting is performed on the open face of the glass slide. Electrodes are connected directly to the side-by-side capillaries and the aluminum foil covering the glass slide substrate. Flow rate is 0.1 ml/hour for each side. Conformal microscopy shows the resulting beads-on-string morphology. (Model. SP2 CLSM manufactured by Leica, USA). Ar/ArKr laser (wavelength 488 nm) and GreNe laser (wavelength 543 nm) are used to excite FITC and Rhodamine B respectively. The absorption (emission) wavelength windows for FITC and Rhodamine B are set to 508~523 nm and 650~750 nm respectively.

EXAMPLE 2

Selective Chemical Modification

In this example, the feasibility of selective reaction for further surface modification of biphasic particles is demonstrated. One side of a jetting solution is composed of PEO (Mw 600,000) 2%, 4-arm-star-shaped PEO with amine end groups (Mw 10,000, Aldrich Co.) 0.5% and dextran (Mw 70,000) 1% by weight dissolved in distilled water. The composition of the other side is PEO (Mw 600,000) 2%, 4-arm-star-shaped PEO with hydroxyl end groups (Mw 10,000, Aldrich Co.) 0.5% and rhodamine-B-dextran (Mw 70,000) 1% by weight in distilled water. Dextran and hydroxyl end group star PEO are employed in each phase in order to ensure equal properties related to the jetting. Each side of the jetting solution is electrospun as a mono-phase to be examined as control experiments. At similar experimental conditions, i.e. 7 kV electrical potential, 25 cm distance between the electrodes and a flow raw of 0.06 ml/hour, both solutions are successfully electrospun to form a beads-on-string morphology on top of glass substrate with the same experimental setup as described in the previous section. Biphasic jetting is performed at 6 kV, 25 cm, 0.05 ml/h for both sides. The electrospun fibers on top of the glass slide from two control mono-phasic jettings and the biphasic jetting are then immersed in BODIPY® solutions in n-hexane for 15 minutes. Since n-hexane is a non-solvent for all of the components, beads-on-string morphology on top of the glass slide remains after the immersing step. Using the specific reaction between the amine and succinymidyl ester, BODIPY® dyes are covalently attached to the surface with amine groups selectively. After this reaction step, the glass slides are immersed in an excess amount of clean n-hexane to make sure all possibly non-selectively adsorbed or diffused-in dyes from the biphasic particles are washed out. The products are then examined by confocal microscopy. Excitation lasers are used as described in previous section, and the absorption wavelength windows for BODIPY® and Rhodamine are 512~539 nm and 630~670 nm, respectively. Rhodamine absorption wavelength window is a designated longer wavelength region than usual in order to tail out the excitation spectrum of BODIPY®.

EXAMPLE 3

Biphasic nano-objects are made form polymer/inorganic material hybrids and are imaged by transmission microscope (Model CM12, Philips). The two jetting solutions are designed to give a contrast by the difference in electron density of each side. The darker side jetting solution consists of 2% PEO (Mw 600,000 g/mol), 0.5% sodium polystyrene sulfonate (PSS, Mw 200,000 g/mol, Aldrich, USA) and 0.3% silver nitrate dissolved in distilled water. Though the solution is kept in dark, dark spots in the TEM picture are due to atomic silver nanocrystals. The lighter side jetting solution consists of 2% PEO and 0.5% FITC-conjugated-dextran. The macromolecular fluorescent dye is mixed in to examine the same sample with a confocal microscope to confirm the biphasic character. Samples for TEM experiments are prepared by direct jetting on to carbon coated copper grid (400 mesh, TED PELLA, Redding Calif., USA). The morphology characterization of nano-objects are performed using a Scanning Electron Microscope (Model XL 30) manufactured by Phillips. Internal structure and the detailed structural features such as electron density and crystalline structures of each phase are investigated by transmission electron microscope (JEOL 301 1, Japan).

EXAMPLE 4

A biphasic object which has primary amine groups in one side is produced using polyethylene imine ("PEI") in one side of jetting solution. Jetting is performed using carbon film coated copper grid on top of aluminum foil as a collecting substrate. About 1 mg of eosin isothiocyantate is solubilized in 100 ml of n-hexane. Immersing the biphasic object on top of copper grid into the eosin solution is performed for 20 min. After this reaction step, the grid is also put on the clean hexane for 60 min to clean out the possible unselectively attached dye. TEM experiments show biphasic character.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming nano-objects, the method comprising:
    combining two or more liquid streams together such that the two or more liquid streams contact over spatial dimensions sufficient to form a composite liquid stream; and
    exposing at least a portion of the composite liquid stream to an electric force field sufficient to form a nano-sized cone jet that is fragmented and then the composite liquid stream is solidified to form the nano-objects, the nano-objects having a non-fibrous shape and comprising multiple phases and multiple chemically distinct exposed surface regions.

2. The method of claim 1 wherein the composite liquid stream is at least partially solidified by a solidification process selected from the group consisting of evaporation, sol-gel transitioning, cooling and combinations thereof.

3. The method of claim 1 wherein the composite liquid stream comprises a cone-jet.

4. The method of claim 1 wherein the composite liquid stream fragments into droplets when exposed to the force field.

5. The method of claim 1 wherein one or more of the liquid streams comprise a component selected from the group consisting of liquid solutions, curable polymer precursors, polymer solutions, polymer melts, and combinations thereof.

6. The method of claim 5 wherein one or more liquid streams further comprise an additive.

7. The method of claim 6 wherein the additive is selected from the groups consisting of inorganic nanocrystals, quantum dots, biomolecules, colorants, crosslinkers, pharmaceutical compounds, molecular probes, molecules that enable drug delivery, and combinations thereof.

8. The method of claim 7 further comprising curing one or more liquid streams comprising curable polymer precursors.

9. The method of claim 8 wherein the polymer precursors are cured thermally or by exposure to actinic radiation.

10. The method of claim 1 wherein the nano-object has a spatial dimension between about 20 nm and about 5,000 nm.

11. The method of claim 1 wherein the nano-object has a spatial dimension between about 20 nm and about 200 nm.

12. The method of claim 1 wherein the nano-object has a spatial dimension between about 50 nm and 500 nm.

13. The method of claim 1 wherein an electric field is formed by applying a potential difference between at least two electrodes from about 0.1 kV to about 25 kV.

14. The method of claim 1 wherein the two or more liquid streams each individually include a colorant and wherein the nano-object is a multiphase colorant.

15. The method of claim 1 wherein one or more liquid streams include one or more reactive components that react with a structural component thereby rendering a resulting surface of the nano-object chemically modified as compared to the surface when the one or more reactive components are not present.

16. A method of forming nano-objects, the method comprising:
    combining two or more liquid streams together at a nozzle such that the two or more liquid streams contact over spatial dimensions sufficient to form a composite liquid stream having a nano-sized cone-jet; and
    exposing at least a portion of the composite liquid stream to an electric field sufficient to fragment and then solidify the composite liquid stream into the nano-objects, the nano-objects comprising multiple phases and multiple chemically distinct exposed surface regions, wherein the nano-objects have a spatial dimension between about 20 nm and about 5,000 nm.

17. The method of claim 16 wherein one or more of the liquid streams comprise a component selected from the group consisting of liquid solutions, curable polymer precursors, polymer solutions, polymer melts, and combinations thereof.

18. A method of forming nano-objects comprising:
    combining two or more liquid streams together at a nozzle such that the two or more liquid streams contact over spatial dimensions sufficient to form a composite liquid stream having a nano-sized cone-jet, wherein one or more of the liquid streams comprise a component selected from the group consisting of liquid solutions, curable polymer precursors, polymer solutions, polymer melts, and combinations thereof and one or more of the liquid streams further comprises an additive selected from the group consisting of inorganic nanocrystals, quantum dots, biomolecules, colorants, crosslinkers, pharmaceutical compounds, molecular probes, molecules that enable drug delivery, and combinations thereof; and exposing at least a portion of the composite liquid stream to an electric field sufficient to fragment and then solidify the composite liquid stream into the nano-objects, the nano-objects having a non-fibrous shape and comprising multiple phases and multiple chemically distinct exposed surface regions.

* * * * *

UNITED STATES PATENT AND TRADEMARK OFFICE
CERTIFICATE OF CORRECTION

PATENT NO. : 8,052,849 B2  Page 1 of 1
APPLICATION NO. : 12/821688
DATED : November 8, 2011
INVENTOR(S) : Joerg Lahann, David C. Martin and Kyung-Ho It is certified that error appears in the above-identified patent and that said Letters Patent is hereby corrected as shown below:

Column 4, line 50, "liquids" should be --liquid--.

Column 5, line 19, after "compatible", insert --with--.

Column 7 line 17, "includes" should be --include--.

Column 7, line 37, after "magnetic)", insert --.--.

Column 8, line 39, "phase" should be --phases--.

Column 9, line 19, after "energies", delete "which".

Column 9, line 30, "MPC's" should be --MPCs--.

Column 9, line 31, "MPC's" should be --MPCs--.

Column 9, line 41, "MCPs" should be --MPCs--.

Column 9, line 42, "MCPs" should be --MPCs--.

Column 9, line 43, "MCPs" should be --MPCs--.

Column 9, line 44, "MCPs" should be --MPCs--.

Column 11, line 6, "MCP" should be --MPCs--.

Column 11, line 8, "MCP's" should be --MPCs--.

Column 11, line 12, "MCP's" should be --MPCs--.

Column 11, line 14, "MPCs" should be --MPCs--.

Column 11, line 32, "((FibriJet" should be --(FibriJet--.

Column 12, line 57, "form" should be --from--.

Signed and Sealed this
Seventh Day of February, 2012

David J. Kappos
*Director of the United States Patent and Trademark Office*